Nov. 26, 1940.  A. HURSCHMAN  2,223,107
METHOD OF AND APPARATUS FOR FORMING TWIST DRILLS AND HELICAL SHAPES
Filed May 23, 1939  2 Sheets-Sheet 1

INVENTOR.
ALFRED HURSCHMAN
BY
ATTORNEYS.

Nov. 26, 1940.     A. HURSCHMAN     2,223,107
METHOD OF AND APPARATUS FOR FORMING TWIST DRILLS AND HELICAL SHAPES
Filed May 23, 1939     2 Sheets-Sheet 2

INVENTOR.
ALFRED HURSCHMAN
BY
ATTORNEYS.

Patented Nov. 26, 1940

2,223,107

UNITED STATES PATENT OFFICE 2,223,107

METHOD OF AND APPARATUS FOR FORMING TWIST DRILLS AND HELICAL SHAPES

Alfred Hurschman, Cleveland, Ohio

Application May 23, 1939, Serial No. 275,209

6 Claims. (Cl. 76—95)

The invention, as indicated, relates to a method and apparatus for forming twist drills and helical shapes. More particularly, it comprises a method for producing helical shapes through pressure exerted upon opposite sides of bar stock of suitable composition and controlling the metal flow under the influence of said pressure, so that the finished article shall have a substantially perfect continuous helical shape free of flash and trim. In most instances it follows the usual forging operations under a rapid action hammer and with the material under treatment heated to the proper degree and maintained at satisfactory temperature through the impact of the die. The invention also includes the provision of apparatus for forming twist drills and helical shapes, which, when suitably operated, will progressively cause the metal stock to be displaced along predetermined lines to form continuous helical grooves and exterior surfaces shaped with a high degree of precision.

The action of the apparatus is such that the grain flow of the metal stock follows the helical shape, thus introducing no structural strains or stresses and providing a drill suitable for heavy duty service with high torque capacity. The service life of the product is likewise very greatly lengthened.

The apparatus also provides for forming an elevated land area, and a relieved land area intermediate the helical flutes or grooves, such elevated land area being of sufficient height to permit finish grinding or machining of a single drill blank size to a variety of finished drill sizes. The apparatus is adapted to form drills or helical shapes of any desired length, running true from center to center. It also forms its own point through natural metal flow providing a beveled end.

The apparatus may also provide for separable die bars set into slots in the die blocks, permitting substitution of die bars to form flutes of differing pitch and form.

Heretofore it has been proposed to forge twist drills and the like through the use of angularly positioned die bars in substantially semi-cylindrical channels in die-blocks but such die bars have been of substantially symmetrical shape and have been unsuited to produce in a single forging operation a finished product free of internal strains and stresses and of accurate and uniform size throughout. Through the use of an apparatus comprising an unsymmetrical peculiarly shaped die bar and cooperating parts, the present invention provides a method and apparatus for high speed accurate production of twist drills and the like suitable for precision work and heavy service requirements. This also brings about a most important saving in material, and in finishing costs, since there is complete elimination of waste, as well as of secondary shaping operations, apart from sandblasting, edge grinding, and the like.

The principal object of the invention is to provide a method and apparatus for making helical shapes, and particularly twist drills, at a high rate of production, low cost, and with high accuracy of result.

Another object of the invention is to provide an apparatus in the form of a pair of cooperating dies which will act upon bar stock of suitable characteristics to form helical grooves therein of a predetermined shape and with a high degree of uniformity of surface through the conjoint successive action of the forming elements of said dies upon said bar stock.

Another object of the invention is to provide means to form twist drills, including helical grooves therein and circumferential surfaces thereon with a high degree of accuracy and speed of production.

Another object of the invention is to provide means to form twist drills from bar stock by forming helical flutes therein and a beveled point thereon with even grain flow of the metal stock throughout and high torque capacity in the finished drills.

Another object of the invention is to provide a die bar to form helical grooves in bar stock or the like through a forging operation in conjunction with cooperating apparatus.

Another object of the invention is to provide a die block having a channel of special shape with an angularly arranged die bar peculiarly shaped to progressively act upon bar stock engaged therein to successively shape the helical groove into finished form throughout the length of such stock under modification, and to provide a beveled end on said stock.

Another object of the invention is to provide a die block having a channel and an angularly arranged die bar therein, and an adjacent material forging area in said channel peculiarly shaped to fill the clearance space with metal at one stage and to distribute such metal at another stage of operation.

A further object of the invention is to provide an apparatus, which, in conjunction with cooperating means, will produce a helical groove in bar stock not restricted as to length and will simultaneously finish the circumferential outline, with a helical land.

Other and further objects of the invention will appear in the course of the following description.

To the accomplishment of the foregoing and related ends, said invention then, consists of the means and method hereinafter fully described and particularly pointed out in the claims, the annexed drawing and the following description setting forth in detail certain means and methods embodying the invention, such disclosed means and methods constituting, however, but several of various forms in which the principle may be employed.

In said annexed drawings—

Figure 1:
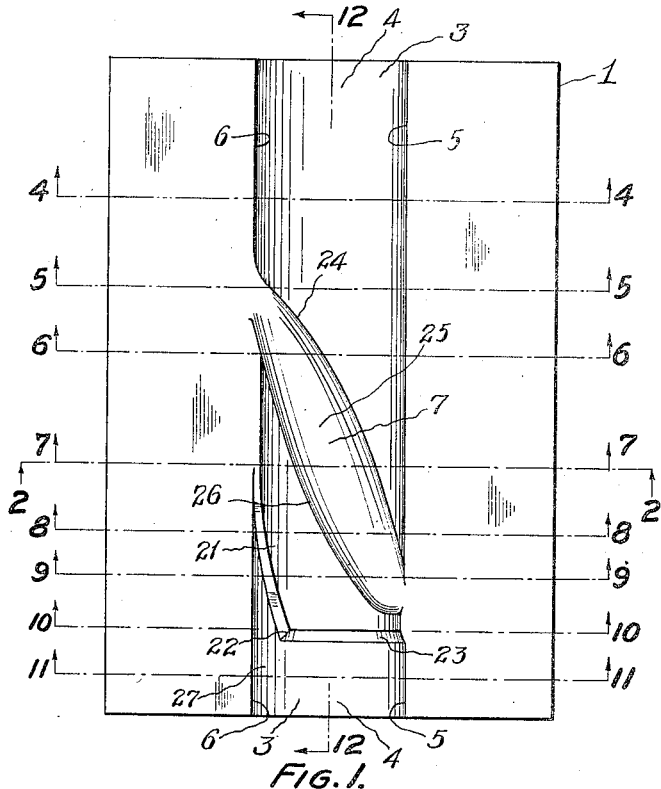
Figure 1 is a top plan view of a die block embodying the principles of the invention as seen along the line 1—1, shown in Fig. 2.
Figure 2:
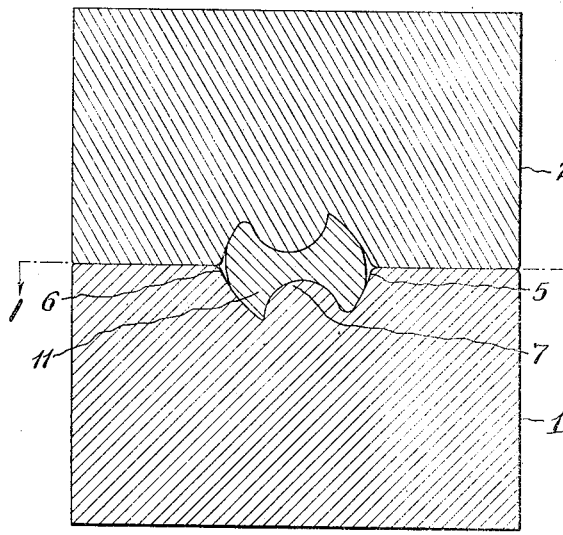
Figure 2 is a vertical sectional view of a pair of assembled die blocks with the work in position therebetween, as seen along the plane indicated by the line 2—2, shown in Fig. 1.

As is clearly shown in Figure 2 of the drawings, lower and upper die blocks 1, 2, are provided, each having an identical shape, and as shown more especially in Figure 1 each having a channel 3 formed across the active face thereof. The channel is of approximately semi-cylindrical cross-section, the central portion 4, at the receiving end of the channel, being preferably formed of true cylindrical cross-section, but the side portions 5, 6, being slightly relieved. Thus the drill stock will be of slightly elliptical cross-section when first deformed between the die blocks, but thereafter such elliptical area will be shaped into true cylindrical shape as the stock is rotated and brought into contact with the true cylindrical surfaces of the die blocks. The true cylindrical surfaces adjacent the receiving end portion and the central portion of the channel also serve to maintain the drill stock and finished work in straight accurate alinement, while the enlarged finishing end of the channel affords ample clearance to prevent injury to the elevated land areas of the finished drills.

Within each channel an angularly positioned die bar 7 is provided. Such die bar may be formed integrally with the die block or as part of an inserted replaceable member 8, received within a diagonally positioned recess 9 across the channel. A knock-out opening 10 is provided beneath the member 8 to provide for its ready removal from the die block. When the die bar is made replaceable, variations in pitch and size of flutes in the finished work may be provided for in a single apparatus.

The die bar 7 is unsymmetrical as seen in plan view or in section and its shape is critical in many respects to precision production, as relatively slight variations may result in an imperfect or non-uniform product. The drawings of this case are made accurately to scale from a die block which has been thoroughly tested, with most satisfactory results.

Figure 3:
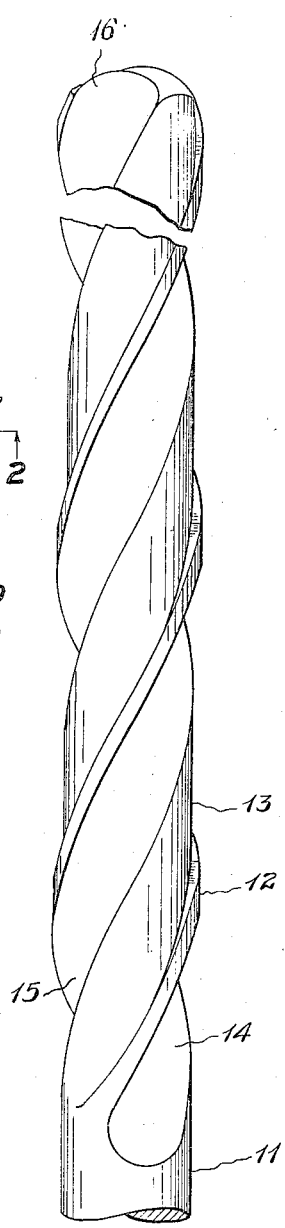
Figure 3 is a perspective view of a finished drill of a type to be produced in the apparatus illustrated herein.

The die bar 7 forms the flutes of the twist drills and the bottom of the channel forms the peripheral portion of the drill or like article. It has been found of advantage to provide a drill 11 of the type shown in Fig. 3, with an elevated helical land 12, and a clearance land area 13, intermediate the respective flutes 14, 15. The active end of the drill, it will be noted, when forged as herein disclosed, shapes itself naturally into a beveled end 16 requiring a minimum of grinding or sharpening to be ready for service. By providing lands of substantial elevation, a single pair of dies can provide stock for a series of drill sizes, as the size variation can be provided by grinding or machining the lands to size.

In order to form the elevated helical lands, the channel is provided on the finishing side of the die bar with a land clearance forming section 21, which is of substantially uniform height above the surface of the channel proper, and of a finishing width to be determined by the requirements as to elevated land width in proportion to clearance land width. The land forming section 21, it will be noted from Fig. 1, is of increasing width to the land finishing point 22 slightly beyond the finishing end of the die bar 7, and preferably ends abruptly along a transverse line 23 so as to provide ample clearance for the elevated lands on finished work to be passed through the cylindrical end areas at the finishing end of the cooperating die blocks. Thus the cylindrical bar stock at the entering end of the channel 3 is received between accurate and true cylindrical central surfaces 4 and is given a somewhat elliptical shape by reason of the relieved or widened areas 5, 6, at the sides of the channels. The elliptical portion is then reduced to true cylindrical shape by the elevated land forming area 21, the work tending to automatically feed itself along as the metal is redistributed by the action of the die blocks.

Figure 11:
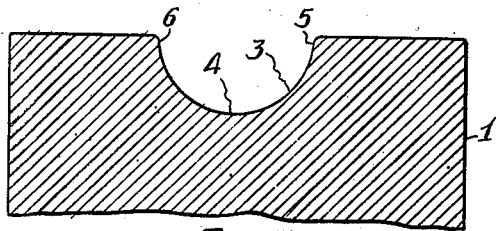
Figures 4, 5, 6, 7, 8, 9, 10 and 11 are transverse sectional views of the die block taken along the lines so numbered respectively in Figures 1 and 12.
Figure 10:
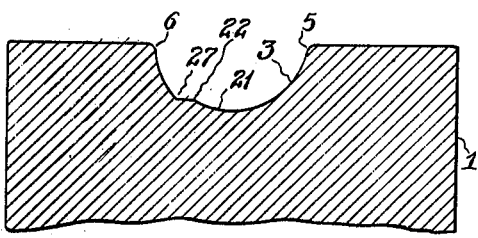
Figure 9:
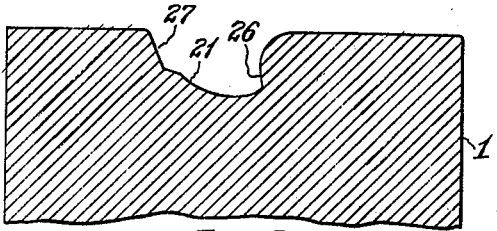
Figure 8:
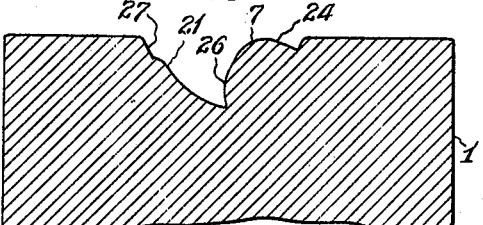
Figure 7:
Figure 6:
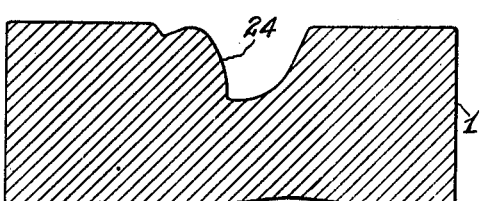
Figure 5:
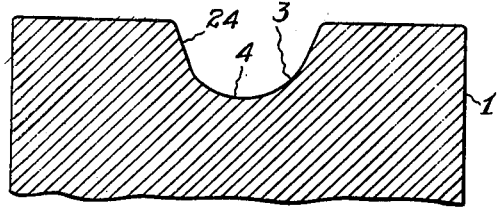
Figure 4:
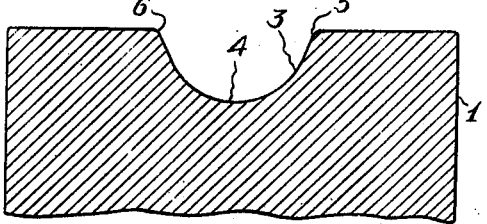
Figure 12:
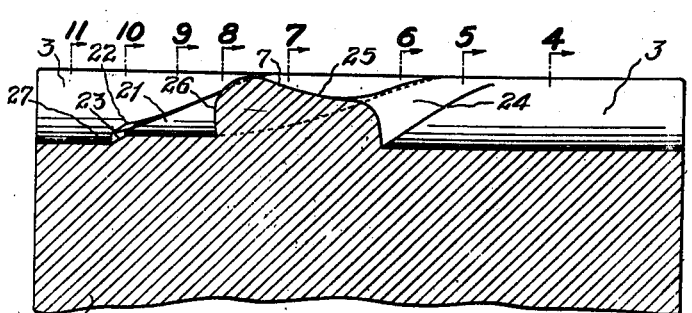
Figure 12 is a longitudinal vertical sectional view of the die block, as seen along the line 12—12, shown in Figure 1.
Figures 13, 14:
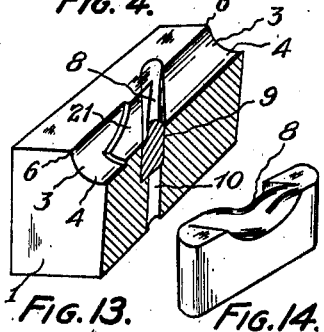
Figure 13 is a perspective view partly in section showing a separable die bar inserted in a die block.
Figure 14 is a perspective view of the die bar insert removed from the die block.

By reference to Figures 4 to 11, it will be observed that the full channel seen in Fig. 4 contracts slightly on the left in Fig. 5, and that the die bar in Fig. 6 presents an abrupt face 24 to the advancing drill stock. At approximately the central point of the die bar the cross-section shown in Fig. 7 is almost symmetrical while its longitudinal section, as shown in Fig. 12, shows a slightly concave upper surface 25. The effect of the die bar on the work is at first to fill the space and form a narrow deep groove in the stock and to bulge the stock at the sides to somewhat elliptical cross-section and thereafter following the turning of the stock and a new series of blows to widen the groove while slightly relieving its depth, and at the same time forcing the elliptical cross-section into true cylindrical form, the metal displacement reacting against the die bar causing forward and angular motion of the drill stock. Thereafter the finishing portion of the die bar as shown in Figure 8 helps to twist the land portion about its abrupt outwardly bowed finishing surface 26, and against the narrow portion of the clearance forming section 21 with the extension land entering the free space 27. The clearance forming section widens in Figures 9 and 10, shaping the elevated and clearance land portions of the drill. The clearance forming area ends at a point spaced from the end of the channel, as is shown in Figure 11. The abrupt overhanging face 26 of the die bar recedes in Figure 9 and disappears in Figure 10.

As has been stated, an apparatus made identically in conformity with the disclosure just reviewed has operated successsfully, while many other die bars under test, including structures shown in earlier patents, have failed to produce a commercial product.

Other modes of applying the principle of my invention may be employed instead of those explained, change being made as regards the means and steps herein disclosed, provided the means stated by any of the following claims or the equivalent of such stated means be employed.

I therefore particularly point out and distinctly claim as my invention:

1. An apparatus of the character described, having in combination a pair of die blocks having transversely extending aligned substantially semi-cylindrical channels in their meeting faces, said channels being adapted to receive a substantially cylindrical length of bar stock of approximately the inner central diameter of the entrance portion of said aligned channels, a die bar extending angularly substantially completely across each respective channel and in a direction reversely to its companion die bar and having a substantial arc of contact with the work, each die bar being of smaller cross-sectional area at the initial contacting end than at its work finishing end, and land clearance forming elevations in said channel on the finishing side of said die bars.

2. An apparatus of the character described having in combination a pair of die blocks having transversely extending aligned substantially semi-cylindrical channels in their meeting faces, said channel being adapted to receive a substantially cylindrical length of bar stock of approximately the inner central diameter of the entrance portion of said aligned channels, a die bar extending angularly substantially completely across each respective channel and in a direction reversely to the companion die bar and having a substantial arc of contact with the work and an unsymmetrical cross-sectional contour, each die bar being of smaller cross-sectional area at the point of initial forging contact with the work at one side of said channel and thereafter of increasing cross-sectional area centrally of said channel in a direction toward the point of finishing forging contact with the work at substantially a point adjacent the opposite upper edge of said semi-cylindrical channel, and a land clearance forming elevation in each of said channels on the finishing side of said die bar for providing clearance area on said bar stock, said land clearance area reducing the size of the bar stock intermediate the portions contacted by the die bars and the raised land portions comprising the unreduced areas having the original diameter of the bar stock.

3. An apparatus of the character described, having in combination a pair of die blocks having transversely extending alined substantially semi-cylindrical channels in their meeting faces, said channels being slightly relieved over portions of their side areas, adapted to receive a substantially cylindrical length of bar stock of approximately the inner central diameter of the entrance portion of said alined channels, a die bar extending angularly substantially completely across each respective channel and in a direction reversely to its companion die bar and having a substantial arc of contact with the work, each die bar being of smaller cross-sectional area at the initial contacting end than at its work finishing end, and land clearance forming elevations in said channels on the finishing sides of the said die bars.

4. A method of forming helical shapes for twist drills which comprises the steps of striking blows on opposite sides of bar stock to produce progressively deepening and widening helical grooves therein simultaneously over a substantial arc of contact approximating a semi-circumference on each side with an elevated land clearance area at one margin of said helical groove for each stage of groove formation and leaving a helical land area of substantially the original size of the bar stock adjacent said clearance area, and progressively advancing said stock with reference to the striking position to successively change the depth and contours of helical grooves as seen in longitudinal cross-section by elongating the fibers of said bar and causing metal flow in the direction of its length and maintaining a straight longitudinal axis of said bar at all stages of the operation.

5. A method of forming helical shapes for twist drills which comprises the steps of striking blows on opposite sides of bar stock to produce progressively deepening and widening helical grooves therein simultaneously over a substantial arc of contact approximating a semi-circumference on each side with an elevated land clearance area at one margin of said helical groove for each stage of groove formation and leaving a helical land area of substantially the original size of the bar stock adjacent said clearance area, and progressively advancing said stock with reference to the striking position to successively change the depth and contours of helical grooves as seen in longitudinal cross-section by elongating the fibers of said bar and causing metal flow in the direction of its length and maintaining a straight longitudinal axis of said bar at all stages of the operation, and thereafter grinding the lands and drill end to cutting edges.

6. A method of forming helical shapes for twist drills which comprises the steps of striking blows on opposite sides of bar stock to produce progressively deepening and widening helical grooves therein simultaneously over a substantial arc of contact approximating a semi-circumference on each side with an elevated land clearance area at one margin of said helical groove for each stage of groove formation, and leaving a helical land area of substantially the original size of the bar stock adjacent said clearance area, and progressively advancing said stock with reference to the striking position to successively change the depth and contours of helical grooves and causing metal flow in the direction of its length and maintaining a straight longitudinal axis of said bar at all stages of the operation, with land height enough to permit one forging operation in a single set of dies to supply drill stock for a multiplicity of sizes of finished drills.

ALFRED HURSCHMAN.